US009524160B2

(12) United States Patent
Takahashi et al.

(10) Patent No.: US 9,524,160 B2
(45) Date of Patent: Dec. 20, 2016

(54) IN-VEHICLE PROGRAM UPDATE APPARATUS

(71) Applicant: DENSO CORPORATION, Kariya, Aichi-pref. (JP)

(72) Inventors: Yasuyuki Takahashi, Okazaki (JP); Yuzo Harata, Chiryu (JP); Takao Mori, Nagoya (JP); Masaya Ohi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/646,097

(22) PCT Filed: Nov. 5, 2013

(86) PCT No.: PCT/JP2013/006513
§ 371 (c)(1),
(2) Date: May 20, 2015

(87) PCT Pub. No.: WO2014/083775
PCT Pub. Date: Jun. 5, 2014

(65) Prior Publication Data
US 2015/0301822 A1 Oct. 22, 2015

(30) Foreign Application Priority Data

Nov. 29, 2012 (JP) .................... 2012-261228

(51) Int. Cl.
*G06F 9/45* (2006.01)
*G06F 9/445* (2006.01)
(Continued)

(52) U.S. Cl.
CPC ............ *G06F 8/665* (2013.01); *B60R 16/023* (2013.01); *G06F 9/445* (2013.01); *G06F 11/30* (2013.01); *G06F 13/00* (2013.01)

(58) Field of Classification Search
CPC ............ G06F 9/445; G06F 13/00; G06F 9/45; G06F 11/30; G06F 8/665; B60R 16/023
See application file for complete search history.

(56) References Cited

U.S. PATENT DOCUMENTS

| | | | | | |
|---|---|---|---|---|---|
| 5,606,557 | A | * | 2/1997 | Kuroshita | ............... H04L 12/44 370/364 |
| 8,683,457 | B1 | * | 3/2014 | Hughes | ................... G06F 9/445 717/168 |

(Continued)

FOREIGN PATENT DOCUMENTS

| | | |
|---|---|---|
| JP | 2002-202895 A | 7/2002 |
| JP | 2009-102003 A | 5/2009 |

(Continued)

OTHER PUBLICATIONS

Chidamber Kulkarni et al., "Interaction Between Data Parallel Compilation and Data Transfer and Storage Cost Minimization for Multimedia Applications", Springer 1999, pp. 668-676, [Retrieved from Internet on Mar. 7, 2016], <http://download.springer.com/static/pdf/541/chp%253A10.1007%252F3-540-48311-X_94.pdf>.*

(Continued)

*Primary Examiner* — Thuy Dao
*Assistant Examiner* — Ziaul A Chowdhury
(74) *Attorney, Agent, or Firm* — Posz Law Group, PLC

(57) ABSTRACT

A gateway electronic control unit (ECU) includes an update condition table that indicates a vehicle load state that updates an ECU program corresponding to each of several ECUs. The gateway ECU wirelessly communicates with an external center apparatus to receive an update file. The gateway ECU uses the update condition table to determine whether the current vehicle load state equals a lightly loaded state capable of updating an ECU program or a heavily loaded state incapable of updating an ECU program. If the (Continued)

current vehicle load state is determined to equal the lightly loaded state, the gateway ECU updates an ECU program using the update file received from the center apparatus. If the current vehicle load state is determined to equal the heavily loaded state, the gateway ECU performs environment improvement control based on the update condition table to change the current vehicle load state to the lightly loaded state.

15 Claims, 4 Drawing Sheets

(51) Int. Cl.
*G06F 13/00* (2006.01)
*G06F 11/30* (2006.01)
*B60R 16/023* (2006.01)

(56) References Cited

U.S. PATENT DOCUMENTS

| | | | | |
|---|---|---|---|---|
| 9,227,579 | B1* | 1/2016 | Laifenfeld | B60R 16/023 |
| 2003/0177129 | A1* | 9/2003 | Bond | G06F 9/445 |
| 2004/0163078 | A1* | 8/2004 | Correa | G06F 8/665 |
| | | | | 717/130 |
| 2005/0060522 | A1* | 3/2005 | Correa | G06F 8/665 |
| | | | | 712/227 |
| 2007/0033312 | A1* | 2/2007 | Flandre | H04L 12/403 |
| | | | | 710/110 |
| 2007/0185624 | A1* | 8/2007 | Duddles | G06F 8/665 |
| | | | | 701/1 |
| 2008/0048844 | A1* | 2/2008 | Watanabe | B60R 25/00 |
| | | | | 340/425.5 |
| 2008/0155209 | A1* | 6/2008 | Tsubouchi | G06F 9/445 |
| | | | | 711/154 |
| 2008/0201702 | A1* | 8/2008 | Bunn | G06F 8/67 |
| | | | | 717/171 |
| 2010/0106982 | A1* | 4/2010 | Castelli | G06F 1/3209 |
| | | | | 713/300 |
| 2010/0115120 | A1* | 5/2010 | Staiger | H04L 67/34 |
| | | | | 709/231 |
| 2010/0138493 | A1* | 6/2010 | Natsume | H04L 12/4135 |
| | | | | 709/204 |
| 2011/0153898 | A1* | 6/2011 | Krempasky, II | B60R 16/023 |
| | | | | 710/306 |
| 2011/0197187 | A1* | 8/2011 | Roh | G06F 8/65 |
| | | | | 717/173 |
| 2011/0258633 | A1* | 10/2011 | Matsumura | G06F 9/468 |
| | | | | 718/104 |
| 2011/0313623 | A1* | 12/2011 | Greer | G06F 11/30 |
| | | | | 701/49 |
| 2012/0265405 | A1* | 10/2012 | Matsumura | B60W 50/0225 |
| | | | | 701/45 |
| 2013/0339721 | A1 | 12/2013 | Yasuda | |
| 2014/0142723 | A1* | 5/2014 | Mori | G06F 13/00 |
| | | | | 700/3 |
| 2015/0089426 | A1* | 3/2015 | Ukai | G06F 13/00 |
| | | | | 715/771 |
| 2015/0336521 | A1* | 11/2015 | Tofilescu | B60R 16/023 |
| | | | | 382/104 |

FOREIGN PATENT DOCUMENTS

| | | |
|---|---|---|
| JP | 2011-070287 A | 4/2011 |
| JP | 2012-221032 A | 11/2012 |

OTHER PUBLICATIONS

Satoru et al. "Japanese Patent Applicantin Publication No. JP 2009102003 (English Translatoin)", [Transleted on Mar. 8, 2016, by Monica Carter, Foreign Patents Service Center, Scientific and Technical Information Center (STIC)].*

Thomas Gustafsson et al. "Data Management in Real-Time Systems: a Case of On-Demand Updates in Vehicle Control Systems", [Online], 2004, pp. 1-10, [Retrieved from Internet on Sep. 15, 2016], <http://ieeexplore.ieee.org/stamp/stamp.jsp?arnumber=1317263>.*

Thomas Gustafsson et al., "Dynamic On-Demand Updating of Data in Real-Time Database Systems", [Online], 2004, pp. 846-853, [Retrieved from Internet on Sep. 15, 2016], <http://delivery.acm.org/10.1145/970000/968074/p846-gustafsson.pdf>.*

Dennis K. Nilsson et al., "Secure Firmware Updates over the Air in Intelligent Vehicles", [Online], 2008, pp. 380-384, [Retrieved from Internet on Sep. 15, 2016], <http://ieeexplore.ieee.org/stamp/stamp.jsp?arnumber=4531926>.*

Karl Koscher et al, "Experimental Security Analysis of a Modern Automobile", [Online], 2010, pp. 1-16, [Retrived from Internet on Sep. 15, 2016], <http://ieeexplore.ieee.org/stamp/stamp.jsp?arnumber=5504804>.*

International Search Report of the International Searching Authority dated Feb. 10, 2014 issued in the corresponding International application No. PCT/JP2013/006513 (and English translation).

Written Opinion of the International Searching Authority dated Feb. 10, 2014 issued in the corresponding International application No. PCT/JP2013/006513 (and English translation).

* cited by examiner

| | UPDATE CONDITION DURING STOP | UPDATE CONDITION DURING TRAVEL | FORBIDDEN CONDITION | EXCEPTION CONDITION |
|---|---|---|---|---|
| ECU31 | (A) REMAINING LEVEL OF BATTERY 6 ≥ SPECIFIED VALUE | | | PROG I |
| ECU32 | (B) ENGINE = OPERATING | | | PROG J, K |
| ... | ... | | | ... |
| ECU36 | (C) ANTI-THEFT ECU 42 ACTIVATED | | | PROG L |
| ECU37 | (A), (B), (C) | (D) COMMUNICATION BUS 5b LOADED LIGHTLY | (G) TEMPERATURE IN VEHICLE COMPARTMENT OUT OF RANGE | PROG M, N, O |
| ECU38 | (A), (B) | (E) VEHICLE SPEED = LOW | (H) NO USER PERMISSION | PROG P |
| ... | ... | ... | | ... |
| ECU42 | (A), (C) | (D), (E) | | PROG Q, R |
| ECU43 | (A), (B) | (F) COMMUNICATION BUS 5c LOADED LIGHTLY | | PROG S, T, U |
| ECU44 | (A), (B), (C) | (E), (F) | | PROG V, W, X, Y, Z |

7a: ECU31–ECU36
7b: ECU37–ECU42
7c: ECU43–ECU44

IN-VEHICLE PROGRAM UPDATE APPARATUS

CROSS REFERENCE TO RELATED APPLICATIONS

This application is the U.S. national stage of International Application No. PCT/JP2013/006513 filed on Nov. 5, 2013 and is based on Japanese Patent Application No. 2012-261228 filed on Nov. 29, 2012, the disclosures of which are incorporated herein by reference.

TECHNICAL FIELD

The present disclosure relates to an in-vehicle program update apparatus that updates a program installed in an electronic control unit (ECU) mounted to a vehicle.

BACKGROUND ART

There is conventionally proposed an in-vehicle program update apparatus, which is mounted on a vehicle and performs wireless communication with an outside center apparatus, thereby receiving an update file to update a program from the center apparatus, and automatically updating the program corresponding to the update file.

For example, such an apparatus eliminates the need for a user to visit a facility (e.g., a dealer or a maintenance factory) where a special tool to rewrite a program is available, the need to provide such a facility with a special tool or technical personnel, or the need for the technical personnel to visit users. This enables to expect to improve the user's convenience or reduce facility costs.

Supposing that a user may update a program after the user gets out of the vehicle, there is proposed a program update system that transmits the following from the vehicle to a center apparatus when updating the program: various vehicle states (e.g., door opening/closing and light turning on/off) and monitoring information that represents video captured by an in-vehicle camera.

According to such a system, an operator to control the center apparatus may notify the user of a suspicious person when detected based on the monitoring information transmitted from the vehicle. When an unlocked door is detected, the center apparatus may transmit a control instruction to lock the door to the vehicle. This enables to expect to diminish the risk of theft (e.g., see Patent Literature 1).

The program update system described in Patent Literature 1 transmits the monitoring information from the vehicle to the center apparatus. The monitoring information represents the light on/off state and the wiper operation state as vehicles states. Based on the monitoring information, an operator transmits a control instruction to save the battery to the vehicle. Specifically, the control instruction turns off a light or stops the wiper operation.

PRIOR ART LITERATURES

Patent Literature

Patent Literature 1: JP 2011-070287 A

SUMMARY OF INVENTION

The program update system described in Patent Literature 1 provides remedies against vehicle theft or battery drain that needs to be taken into consideration while the vehicle is parked. However, the program update system does not transmit a useful control instruction from the center apparatus to the vehicle while a user is on board and is driving the vehicle.

The program update system described in Patent Literature 1 allows the center apparatus to receive the monitoring information from the vehicle. The operator needs to monitor vehicle states and video captured by the in-vehicle camera. This may increase various costs such as communications traffic and manpower expenses.

It is an object of the present invention to provide an in-vehicle program update apparatus capable of updating a program safely, more efficiently at low costs.

To achieve the above object, according to an example of the present disclosure, an in-vehicle program update apparatus mounted to a vehicle is provided as follows. A storage portion stores an update condition table that indicates a vehicle load state capable of updating a program installed in each of a plurality of electronic control units included in an in-vehicle network system.

An update file reception portion wirelessly communicates with an external center apparatus and receives from the center apparatus an update file to update the program. When the update file reception portion receives the update file, an update determination section determines whether updating a program is enabled or not based on the update condition table stored in the storage portion. In specific, it is determined whether a current vehicle load state equals a lightly loaded state capable of updating a program corresponding to the update file or a heavily loaded state incapable of updating the program.

When the update determination section determines the lightly loaded state, a program update section uses the update file received by the update file reception portion to update the program corresponding to the update file. When the update determination section determines that the current vehicle load state equals the heavily loaded state, an environment improvement section performs an environment improvement control to change the current vehicle load state to the lightly loaded state based on the update condition table stored in the storage portion.

The above-mentioned configuration settles the update condition to update a program for the electronic control unit corresponding to the program to be updated and therefore needs not always stop the vehicle. Some electronic control units can update programs if the update condition is satisfied even when a user is onboard while the vehicle is traveling. This enables to increase chances to update the programs.

The update condition is not satisfied if the vehicle load state equals the heavily loaded state. No program is updated when the vehicle travel is affected, for example. This enables to ensure user's safety.

If no update condition is satisfied, the environment is controlled so that the vehicle load state equals the lightly loaded state. This enables to further increase chances to update the programs. Moreover, the vehicle determines, based on the vehicle load state, whether or not a program can be updated. The vehicle then performs the environment improvement control as needed. The vehicle need not transmit information indicating the vehicle load state to the center apparatus. This enables to reduce unnecessary communication costs.

According to the above-mentioned example configuration of the disclosure, the in-vehicle program update apparatus can safely and more efficiently update the programs at low cost.

The program signifies at least one of several program parts and data parts included in a program needed for a process the electronic control unit performs to control control-target instruments (e.g., vehicle components including an engine and a brake and the other electronic control units).

The update condition table advantageously indicates the vehicle load states corresponding to the types of ECU programs. This enables to update even programs installed on the same electronic control unit if an update condition subdivided into program parts or data parts is satisfied. This enables to further increase chances to update the programs.

If a user manipulation may be needed to stop the vehicle, for example, the environment improvement control may be provided as control (user notification control) to notify this situation to the user. The environment improvement control may be provided as bus load reduction control to reduce a load on the communication bus as a vehicle load state. The communication bus connects with the above-mentioned electronic control units. The program update section transmits an update file to the corresponding electronic control unit via the communication bus and allows the electronic control unit to update the program.

Under the bus load reduction control, the load on the communication bus is reduced and then the communication bus is used to transmit an update file. This enables to appropriately update programs while the vehicle is traveling, for example, without affecting the operation of the in-vehicle network system (consequently, without affecting the travel of the vehicle).

The electronic control units in the in-vehicle network system are classified into travel-related electronic control units to control travel of the vehicle and the other non-travel-related electronic control units.

Based on the above-mentioned premise, the non-travel-related electronic control unit uses one transmission interval to periodically transmit information to the other electronic control units via the communication bus. The travel-related electronic control unit uses another transmission interval to periodically transmit information to the non-travel-related electronic control unit via the communication bus. The bus load reduction control may extend at least one of the transmission intervals within a predetermined allowable range.

The bus load reduction control eliminates the need to change transmission intervals for information periodically transmitted from the travel-related electronic control units to control vehicle components such as an engine and a brake to the other travel-related electronic control units. A transmission interval for the other information is extended without directly affecting the travel control on the vehicle. This enables to appropriately reduce a bus load.

The bus load reduction control may inhibit some of the non-travel-related electronic control units from transmitting information to the other electronic control units (including the travel-related electronic control units and the other non-travel-related electronic control units) via the communication bus.

The bus load reduction control also transmits information from the travel-related electronic control units that control vehicle components such as an engine and a brake. For example, some of the non-travel-related electronic control units are forced into the bus sleep state without directly affecting the travel control on the vehicle. This enables to appropriately reduce a bus load.

BRIEF DESCRIPTION OF DRAWINGS

The above and other objects, features and advantages of the present disclosure will become more apparent from the following detailed description made with reference to the accompanying drawings. In the drawings:

FIG. 3 is a matrix diagram illustrating an update condition table; and

DETAILED DESCRIPTION

Embodiments of the present disclosure will be described with reference to the accompanying drawings.

<Overall Configuration>

Figure 1:
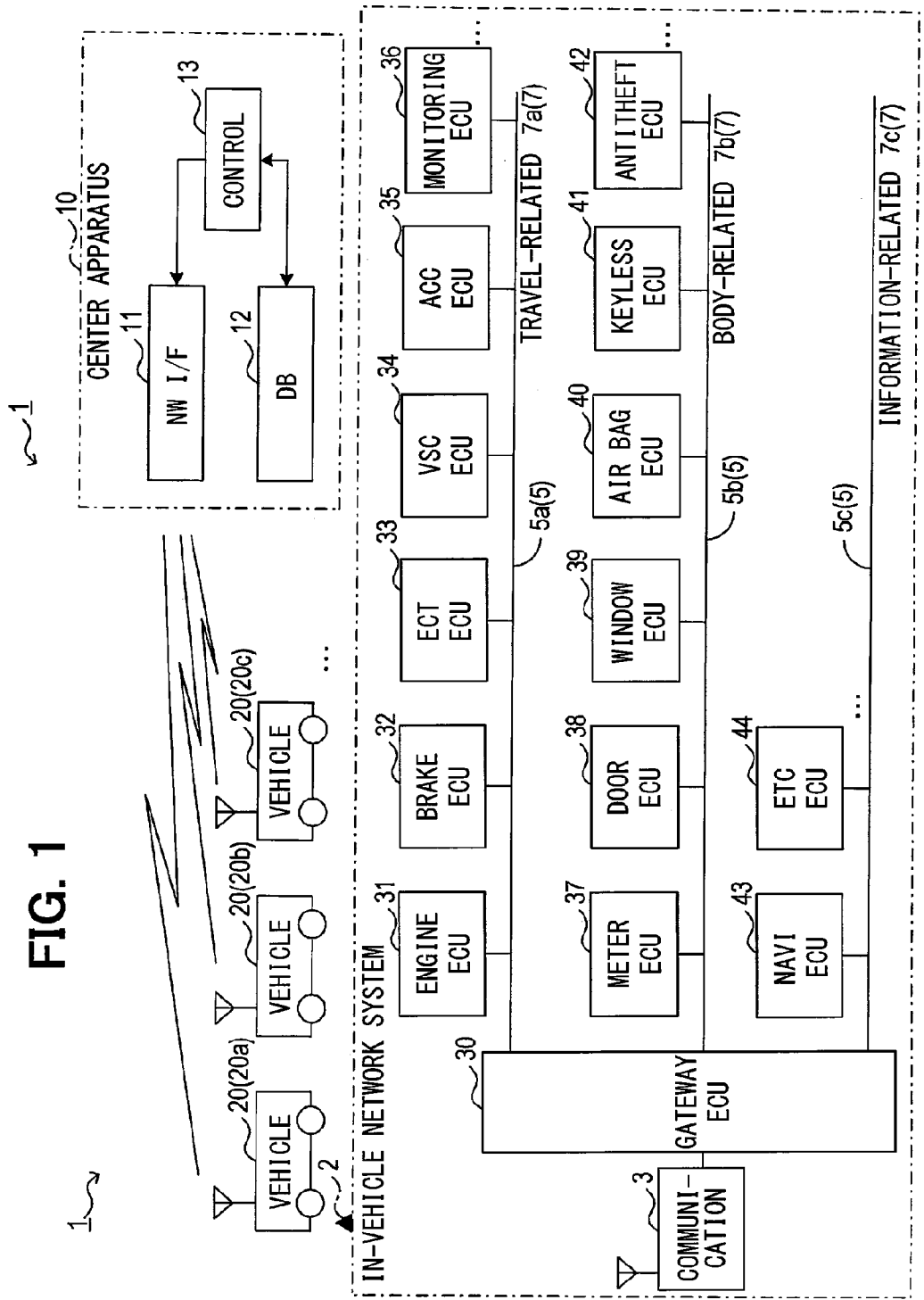
FIG. 1 is a block diagram illustrating a configuration of an in-vehicle network system and a center apparatus according to an embodiment of the present disclosure.

As illustrated in FIG. 1, a program update system 1 according to the embodiment updates a program installed in each electronic control unit (hereinafter referred to as "ECU") 30 through 44 placed in a vehicle. The program update system 1 includes a center apparatus 10 and several vehicles 20 (20a, 20b, 20c, and so on). The center apparatus 10 is installed at an information center, namely, a facility to operate the system. The vehicles 20 (20a, 20b, 20c, and so on) each use several ECUs 30 through 44 to configure an in-vehicle network system 2. In the following description, the vehicles 20 (20a, 20b, 20c, and so on) are simply depicted as the vehicle 20 because the vehicles 20 (20a, 20b, 20c, and so on) include the same configuration.

The program update system 1 previously assigns each vehicle 20 a vehicle ID to identify the vehicle. Each vehicle 20 includes a communication terminal 3 to wirelessly communicate with the outside of the vehicle. The ECUs 30 through 44 are directly or indirectly connected to the communication terminal 3 in the in-vehicle network system 2 to be capable of exchanging information with the center apparatus 10 each other via a mobile communication network and the Internet. The communication terminal 3 may perform wireless communication with an external apparatus such as the center apparatus 10 via a portable communication apparatus such as a mobile telephone or a smartphone the user carries into the vehicle 20. The present application uses "information" as a countable noun as well as an uncountable noun.

The center apparatus 10 includes a network I/F 11, a database 12, and a control circuit 13. The network I/F 11 enables connection to the Internet network. The database 12 registers versions of programs (hereinafter referred to as "ECU programs") installed in the ECUs 30 through 44 corresponding to each vehicle ID. The control circuit 13 performs a program management process that manages installation states of the ECU programs using the database 12.

The control circuit 13 is mainly configured as a known microcomputer including a CPU, ROM, and RAM. The CPU performs the program management process based on a program stored in the ROM using the RAM as a work area.

Specifically, the program management process references the database 12 and determines whether or not the latest version of the ECU program is installed in the ECUs 30 through 44. The vehicle 20 corresponding to the vehicle ID may include the ECU (at least one of the ECUs 30 through 40) that needs to update the ECU program to the latest version. In this case, the program management process transmits an update file to perform the update to the vehicle 20 via the network I/F 11. The vehicle 20 receives the update file and updates the corresponding ECU program using the received update file. The vehicle 20 then notifies the update to the center apparatus 10. The control circuit 13 receives the notification from the vehicle 20 via the network I/F 11 and rewrites the content of the database 12 to the new one based on the vehicle ID.

The ECU program signifies at least one of several program parts and data parts included in a program needed for a process each of the ECUs 30 through 44 performs to control control-target instruments (including other ECUs) assigned to the ECU. In other words, the update file transmitted from the center apparatus 10 to the vehicle 20 contains not only a main program as a base of processes performed by the ECUs 30 through 44. The update file also contains subordinate programs such as applications categorized into functions and data used for the applications (e.g., map data, data concerning a base station for the mobile communication network, and data used for the display design). The update file updates these programs and data to the new ones as needed.

<ECU Configuration>

Figure 2:
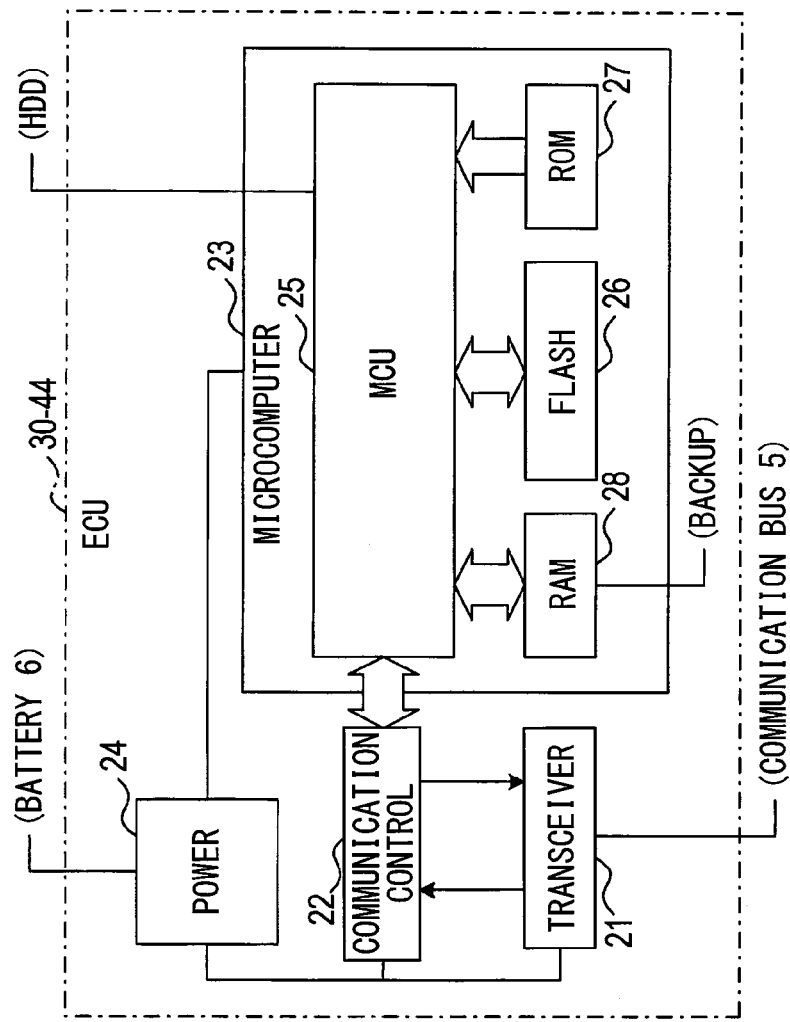
FIG. 2 is a block diagram illustrating a configuration of an electronic control unit.

Basically, the ECUs 30 through 44 are equally configured as illustrated in FIG. 2. The ECU includes a transceiver 21, a communication controller 22, a microcomputer 23, and a power supply circuit 24. The transceiver 21 transmits data to a communication bus 5 and receives data needed for the ECU from the communication bus 5. The communication controller 22 controls the communication via the communication bus 5 based on a specified protocol. The microcomputer 23 controls the communication controller 22 to communicate with the other ECUs and performs various processes in cooperation with the other ECUs to implement various functions assigned to the ECU. The power supply circuit 24 converts an input voltage from a battery 6 mounted in the vehicle 20 into an internal voltage and supplies the power to the components 21 through 23.

The microcomputer 23 includes a microcontroller unit (hereinafter referred to as "MCU") 25, flash memory 26, ROM 27, and RAM 28. The MCU 25 performs various processes based on an ECU program. The flash memory 26 stores various ECU programs to control a control-target instrument assigned to the ECU. The ROM 27 stores a boot loader that provides a function to rewrite the ECU programs stored in the flash memory 26. The RAM 28 is used as work memory when the MCU 25 performs various processes.

The MCU 25 receives an update file via the communication controller 22. Based on the updated file, the MCU 25 uses the boot loader stored in the ROM 27 to update the corresponding ECU program in the flash memory 26 to the new content.

<In-Vehicle Network System Configuration>

Returning back to FIG. 1, the in-vehicle network system 2 includes an in-vehicle LAN 7 and a gateway ECU 30. The in-vehicle LAN 7 includes the electronic control units (ECUs 31 through 44) placed in the vehicle 20. The gateway ECU 30 manages data indicating travel states of the vehicle 20 (e.g., driver's manipulation states, the behavior and states of the vehicle 20) based on data supplied from the ECUs 31 through 44 in the in-vehicle LAN 7.

The in-vehicle LAN 7 configured in the vehicle 20 includes series networks whose protocols differ from each other. Specifically, the series networks include a travel-related network 7a, a body-related network 7b, and an information-related network 7c. The networks 7a, 7b, and 7c correspond to common communication buses 5a, 5b, and 5c, respectively. The communication buses connect with the above-mentioned ECUs corresponding to the networks in the vehicle 20.

For example, the travel-related network 7a connects with an engine ECU 31, a brake ECU 32, and an ECT•ECU 33. The engine ECU 31 includes various functions to control an engine as a control-target instrument. The brake ECU 32 includes various functions to control a brake. The ECT•ECU 33 includes various functions to control an automatic transmission. These electronic control units are related to a so-called power train.

The engine ECU 31 connects with a vehicle speed sensor, a throttle angle sensor, an accelerator pedal angle sensor, and a fuel quantity sensor. The brake ECU 32 connects with a brake pedal operation sensor. The ECT•ECU 33 connects with a shift lever position sensor, and a transmission state sensor. Each of the power-train-related ECUs 31 through 33 periodically transmits detection values received from the sensors connected to the ECU to the communication bus 5a. The detection values are supplied as data to be shared with the other ECUs.

The travel-related network 7a connects with a VSC•ECU 34, an ACC•ECU 35, and a perimeter monitoring ECU 36. The VSC•ECU 34 includes various functions to control the vehicle's attitude and drive. The ACC•ECU 35 includes various functions to control the vehicle travel so that the vehicle can follow a preceding vehicle. The perimeter monitoring ECU 36 determines the risk of collision with an obstacle based on a captured image around the vehicle or a reflected radar wave and controls the vehicle according to the risk of collision. These electronic control units are related to control so that the power-train-related ECUs 31 through 33 are regarded as control-target instruments.

The VSC•ECU 34 connects with a steering sensor. The ACC•ECU 35 connects with an acceleration sensor or a yaw rate sensor. The perimeter monitoring ECU 36 connects with an image sensor or a radar sensor. Each of the control-related ECUs 34 through 36 periodically transmits detection values received from the sensors connected to the ECU to the communication bus 5a. The detection values are supplied as data to be shared with the other ECUs.

The power-train-related ECUs 31 through 33 and the control-related ECUs 34 through 36 correspond to the travel-related network 7a and are generically referred to as travel-related ECUs 31 through 36 in the following description.

The body-related network 7b connects with a meter ECU 37, a door ECU 38, a window ECU 39, and an air bag ECU 40, for example. The meter ECU 37 includes various functions to control display of a meter as a control-target instrument. The door ECU 38 includes various functions to control door opening/closing (lock/unlock). The window ECU 39 includes various functions to control window glass opening/closing. The air bag ECU 40 includes various functions to control operation of an air bag. These electronic control units are related to the body.

For example, the meter ECU 37 allows a display apparatus to display vehicle's various states such as a vehicle speed, an engine speed, a transmission shift pattern, a remaining fuel quantity (fuel quantity), and a door opening/closing state. Of these informations, data concerning the vehicle speed, the engine speed, the transmission shift pattern, and the remaining fuel quantity (fuel quantity) is periodically received from the travel-related ECUs 31 through 36 via the communication bus 5a, the gateway ECU 30, and the communication bus 5b. Data concerning the door opening/closing state is periodically received from the window ECU 39 via the communication bus 5b. Each of the body-related ECUs 37 through 40 periodically transmits information indicating states of the control-target instruments corresponding to the ECU to the communication bus 5b. The information is supplied as data to be shared with the other ECUs. An interval to transmit data to the communication bus 5b complies with a control instruction issued from the gateway ECU 30.

The body-related network 7b connects with a keyless ECU 41 and an anti-theft ECU 42. The keyless ECU 41 includes a function to unlock the door when an authenticated wireless signal is transmitted from a smart key. The anti-theft ECU 42 includes a function to monitor vehicle states and generate an alarm when a malicious person is going to steal an instrument in the vehicle 20. These electronic control units are related to control so that the body-related ECUs 37 through 40 are regarded as control-target instruments.

The body-related ECUs 37 through 40 and the control-related ECUs 41 through 42 correspond to the body-related network 7b and are generically referred to as body-related ECUs 37 through 42 in the following description. Some of the body-related ECUs 37 through 42 (e.g., the keyless ECU 41 and the anti-theft ECU 42) follow a control instruction from the gateway ECU 30 and allow the power supply circuit 24 to stop supplying the power to the communication controller 22 for the corresponding ECU, thereby transitioning to a bus sleep state that inhibits the use of the communication bus 5c.

The information-related network 7c connects with a navigation ECU 43 and an ETC (registered trademark)•ECU 44, namely, information-related electronic control units. These ECUs control multimedia-related electrical units as control-target instruments that (visually or audibly) provide various types of information. The navigation ECU 43 includes a function to compute a route or provide route guidance based on the vehicle's current position, destination, or map data or a function to reproduce user-specified radio or television programs and CD or DVD contents. The ETC•ECU 44 includes a function to perform wireless communication with a roadside apparatus installed at the entry and the exit (tollbooth) of a toll road and make payment needed to travel the toll road while allowing a vehicle to pass through the tollbooth at a vehicle speed of approximately 20 km/h or lower.

The navigation ECU 43 connects with a storage unit such as a hard disk, flash memory, or an SD memory card (registered trademark). The storage unit stores various types of data such as map data and music data. The navigation ECU 43 periodically transmits information indicating the vehicle's current position to the communication bus 5c. The information is supplied as data to be shared with the other ECUs. An interval to transmit data to the communication bus 5c complies with a control instruction issued from the gateway ECU 30.

The information-related ECUs 43 and 44 periodically receive data indicating detection values such as the vehicle speed from the travel-related ECUs 31 through 36 via the communication bus 5a, the gateway ECU 30, and the communication bus 5c. Some of the information-related ECUs 43 and 44 (e.g., the navigation ECU 43) follow a control instruction from the gateway ECU 30 and allow the power supply circuit 24 to stop supplying the power to the communication controller 22 for the corresponding ECU, thereby transitioning to the bus sleep state that inhibits the use of the communication bus 5c.

The in-vehicle network system 2 according to the embodiment uses a predetermined communication protocol to exchange shared data (e.g., detection data) between ECUs at least belonging to the same series network. The in-vehicle network system 2 according to the embodiment includes the gateway ECU 30 to relay the data communication so as to be capable of exchanging shared data between ECUs belonging to different series networks.

<Gateway ECU Configuration>

The gateway ECU 30 connects with the above-mentioned communication terminal 3. The gateway ECU 30 uses the communication terminal 3 to perform wireless communication with the external center apparatus 10 and thereby receive an update file transmitted from the center apparatus 10.

The gateway ECU 30 is connected to all the communication buses 5a, 5b, and 5c belonging to the series network 7a, 7b, and 7c. The gateway ECU 30 receives all the shared data in the in-vehicle network system 2 to manage travel states of the vehicle 20 (e.g., driver's manipulation states, the behavior and states of the vehicle 20) and load states of the communication buses 5a, 5b, and 5c.

The gateway ECU 30 stores an update condition table 30a in the flash memory 26. The update condition table 30a specifies a condition (i.e., an ECU program update condition) capable of updating the ECU program corresponding to each of the ECUs 31 through 44.

As illustrated in FIG. 3, the update condition table 30a specifies several vehicle states representing conditions to update an ECU program for each ECU. Basically, of the ECUs 31 through 44, the ECUs (travel-related ECUs 31 through 36) belonging to the travel-related network 7a are capable of updating the ECU programs if the other update conditions (update conditions during stop) are satisfied only when the vehicle 20 stops (such as parking). The ECUs (body-related ECUs 37 through 42) belonging to the body-related network 7b and the ECUs (information-related ECUs 43 and 44) belonging to the information-related network 7c are capable of updating the ECU programs if the other update conditions (update conditions during travel) are satisfied even when the vehicle travels.

For example, the update condition during stop signifies that the remaining level of the battery 6 is higher than or equal to a predetermined value, the engine is active, or the anti-theft ECU 42 is active. These conditions describe vehicle states specified to prevent the battery 6 from being consumed or the vehicle 20 from being stolen when the ECU programs are updated.

For example, the update condition during travel signifies that the communication bus 5 is lightly loaded or the vehicle speed is low. These conditions describe vehicle states specified to update the ECU programs even when the vehicle 20 is traveling.

Basically, as described above, the update condition table 30a specifies various update conditions corresponding to the ECUs in order to determine a vehicle load state, namely, to determine whether the vehicle 20 is lightly loaded to enable to update the ECU programs or is heavily loaded to disable to update the ECU programs.

In addition to the update condition during stop and the update condition during travel as described above, the update condition table 30a specifies a forbidden condition. The update condition table 30a is predetermined not to update the ECU programs under the forbidden condition. For instance, the forbidden condition signifies that the temperature in the vehicle compartment exceeds a temperature range specification for the ECU or no user permission is obtained.

Further, the update condition table 30a specifies various exception conditions. For example, the update condition table 30a permits the update of some ECU programs for the travel-related ECUs 31 through 36 if the update condition during travel is satisfied even when the vehicle 20 is traveling. The update condition table 30a inhibits the update of some ECU programs for the body-related ECUs 37 through 42 and the information-related ECUs 43 and 44 when the vehicle 20 is traveling.

As described above, the update condition table 30a specifies the forbidden conditions and the exception conditions for the types of ECU programs as well as various types of update conditions for the ECUs.

In the microcomputer 23 of the gateway ECU 30, the MCU 25 references the update condition table 30a stored in the flash memory 26 based on a program stored in the ROM 27 and performs an in-vehicle program update process to be described below.

<In-Vehicle Program Update Process>

Figure 4:
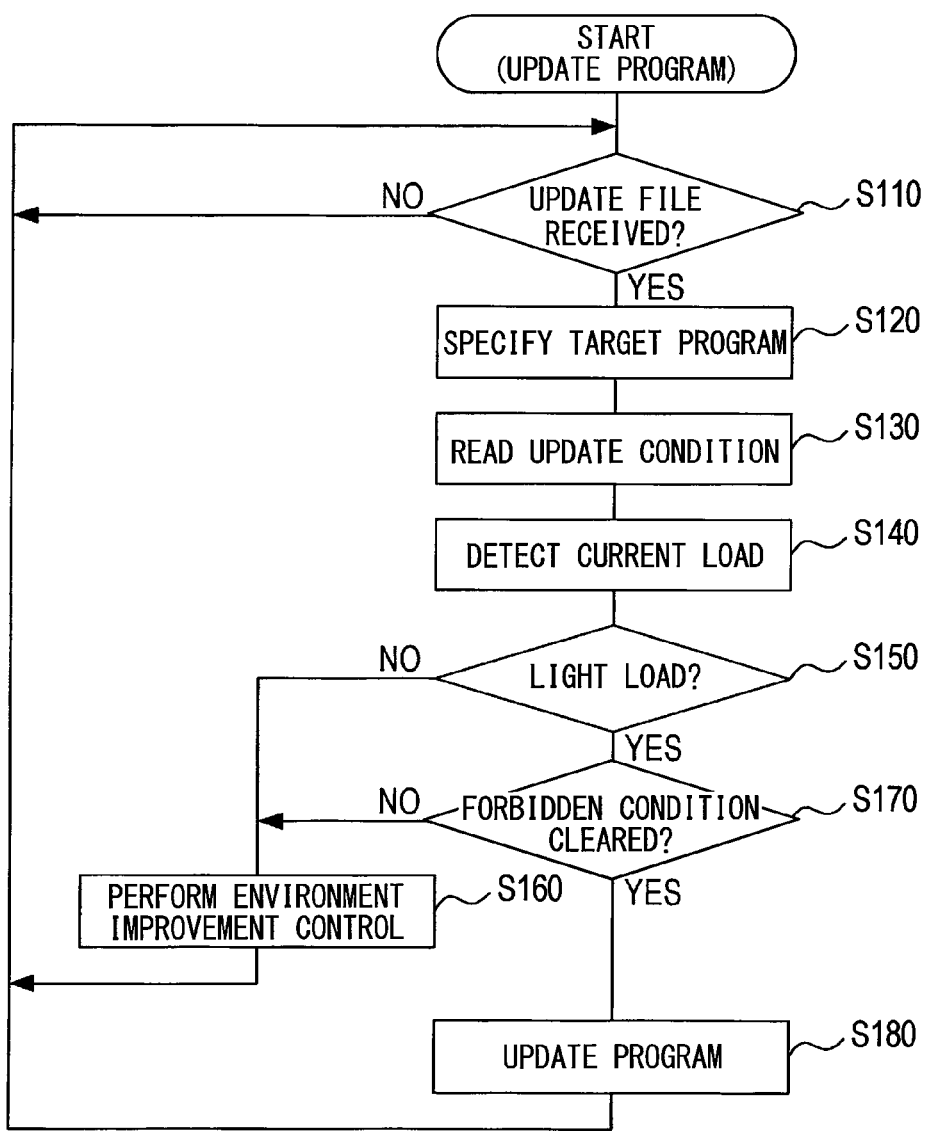
FIG. 4 is a flowchart illustrating a process performed by the in-vehicle program update apparatus.

With reference to the flowchart in FIG. 4, the following describes the in-vehicle program update process performed by the microcomputer 23 (MCU 25) of the gateway ECU 30. The process starts when an ignition switch of vehicle 20 is turned on, for example. The process terminates after a predetermined time elapsed from when the ignition switch is turned off (after an ECU program, if being updated, has been updated).

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Suppose that the in-vehicle program update process starts as illustrated in FIG. 4. At S110, the MCU 25 determines whether or not an update file is received from the center apparatus 10 via the communication terminal 3. If the determination is affirmed, the MCU 25 proceeds to S120. If the determination is negated, the MCU 25 waits. The update file includes identification information indicating an ECU program to be updated and the ECU type.

At S120, the MCU 25 specifies an ECU (hereinafter referred to as "target ECU") corresponding to an ECU program to be updated and an ECU program (hereinafter referred to as "target program") to be updated in the target ECU based on the identification information attached to the update file received at S110. The MCU 25 then proceeds to S130.

At S130, the MCU 25 reads an update condition corresponding to the target ECU and the target program specified at S120 from the update condition table 30a stored in the flash memory 26. At S140, the MCU 25 detects a vehicle load state based on shared data (most recent shared data) in the in-vehicle network system 2.

At S150, the MCU 25 determines whether or not the vehicle load state (i.e., the current vehicle load state) detected at S140 equals a lightly loaded state that satisfies the various update conditions (update condition during stop, update condition during travel, and exception condition) read at S130. If the determination is affirmed, the MCU 25 proceeds to S170. If the determination is negated, the MCU 25 proceeds to S160, assuming that the current vehicle load state equals a heavily loaded state.

For example, suppose that the target ECU (any of the travel-related ECUs 31 through 36) belongs to the travel-related network 7a. In such case, the MCU 25 determines that the current vehicle load state equals the lightly loaded state if the update condition during stop corresponding to the target ECU is satisfied when the vehicle 20 stops. However, suppose that the target ECU corresponds to any of the travel-related ECUs 31 through 36 and the target program equals the ECU program corresponding to the above-mentioned exception condition. In such case, the MCU 25 determines that the current vehicle load state equals the lightly loaded state if the update condition during travel corresponding to the target program is satisfied even when the vehicle 20 travels.

Suppose that the target ECU equals the ECU (any of the body-related ECUs 37 through 42) belonging to the body-related network 7b or the ECU (any of the information-related ECUs 43 and 44, namely, non-travel-related ECUs 37 through 44) belonging to the information-related network 7c. In this case, the MCU 25 determines that the current vehicle load state equals the lightly loaded state if the update condition during stop corresponding to the target ECU is satisfied when the vehicle 20 stops or if the above-mentioned update condition during travel corresponding to the target ECU is satisfied when the vehicle 20 is traveling. Suppose that the target ECU equals any of the non-travel-related ECUs 37 through 44 and the target program equals the ECU program corresponding to the above-mentioned exception condition. In this case, the MCU 25 determines that the current vehicle load state equals the heavily loaded state when the vehicle 20 is traveling.

As described above, the MCU 25 uses the update condition table 30a to determine the current vehicle load state based on the ECU program to be updated and the ECU type. Specifically, the MCU 25 determines whether the current vehicle load state equals the lightly loaded state to enable the target program to be updated or the heavily loaded state to disable the target program from being updated.

The MCU 25 proceeds to S160 if determining that the current vehicle load state equals the heavily loaded state. At S160, the MCU 25 performs environment improvement control to change the current vehicle load state to the lightly loaded state, and then returns to S110.

For example, suppose that the heavily loaded state is detected because the vehicle 20 is traveling. In such case, the MCU 25 performs user notification control to audibly or visually notify a driver of a message that prompts manipulation to stop (or park) the vehicle 20 at a safe place.

For example, suppose that the heavily loaded state is detected because the update condition during stop is not satisfied. In such case, the MCU 25 operates the engine of the vehicle 20 to increase the remaining level of the battery 6 or operates the anti-theft ECU 42 to prevent the vehicle 20 from being stolen. Further, the MCU 25 may turn off a light, if turned on, of the vehicle 20 or stop a wiper, if active, of the vehicle 20.

For example, suppose that the heavily loaded state is detected because the update condition during travel is not satisfied. In such case, the MCU 25 performs the user notification control or bus load reduction control. The user notification control in this case notifies a driver that the target program can be updated if the vehicle speed can remain lowered to a predetermined speed capable of the update. The bus load reduction control changes a load state of the communication bus 5 to the lightly loaded state so as not to affect the travel of the vehicle 20.

Specifically, the bus load reduction control transmits a control instruction to reduce a bus load on the communication bus 5*b* to the body-related ECUs 37 through 42 if the target ECU corresponds to any of the body-related ECUs 37 through 42. The bus load reduction control thereby extends a transmission interval for the body-related ECUs 37 through 42 to transmit shared data to the communication bus 5*b* within a predetermined allowable range. Shared data may be received from the travel-related ECUs 31 through 36 or the information-related ECUs 43 and 44 and may be relayed to the body-related ECUs 37 through 42. In such case, the bus load reduction control extends a transmission interval to transmit shared data to the communication bus 5*b* within the allowable range. The same applies to the target ECU that equals the information-related ECU 43 or 44. Namely, the bus load reduction control extends a communication interval for the information-related ECUs 43 and 44 to transmit shared data to the communication bus 5*c* within the allowable range. The bus load reduction control extends a communication interval to transmit shared data to the communication bus 5*c* within the allowable range when the shared data is received from the travel-related ECUs 31 through 36 or the body-related ECUs 37 through 42.

Specifically, the bus load reduction control forces some of the body-related ECUs 37 through 42 except the target ECU into the above-mentioned bus sleep state as needed to decrease the usage rate of the communication bus 5*b* when the target ECU corresponds to any of the body-related ECUs 37 through 42. The bus load reduction control also forces some of the information-related ECUs 43 and 44 except the target ECU into the bus sleep state as needed when the target ECU corresponds to any of the information-related ECUs 43 and 44.

As described above, the environment improvement control such as the user notification control or the bus load reduction control is performed to change the current vehicle load state from the heavily loaded state to the lightly loaded state.

The MCU 25 proceeds to S170 when the current vehicle load state equals the lightly loaded state. At S170, the MCU 25 determines whether or not the above-mentioned forbidden condition is cleared. If the determination is affirmed, the MCU 25 proceeds to S180. If the determination is negated, the MCU 25 returns to S160.

For example, the MCU 25 returns to S160 to clear the forbidden condition if the temperature in the vehicle compartment exceeds a temperature range specification for the target ECU. The environment improvement control is performed to adjust the air conditioning so that the temperature in the vehicle compartment satisfies the temperature range specification for the target ECU. This signifies that the vehicle load state is changed from the heavily loaded state to the lightly loaded state.

For example, the user may not permit the update of a target program. In such case, the MCU 25 returns to S160 to obtain the user permission. The MCU 25 performs the user notification control (environment improvement control) to audibly or visually prompt the input manipulation that activates the user permission.

Finally, the MCU 25 proceeds to S180 if the current vehicle load state equals the lightly loaded state and the forbidden condition is cleared. At S180, the MCU 25 allows the communication controller 22 to transmit the update file to the target ECU, allows the target ECU to update the target program using the update file, and returns to S110. If the target program is normally updated, the MCU 25 turns off the above-mentioned environment improvement control. Further, if the target program is normally updated, the MCU 25 allows the communication terminal 3 to transmit a notification indicating the successful update along with the above-mentioned vehicle ID to the center apparatus 10. If the target program is updated unsuccessfully, the MCU 25 may notify the user of the unsuccessful update, the reason for it, or a remedy. Further, if the target program is updated unsuccessfully, the MCU 25 may again perform the same process concerning the update file from S110. In this case, the target program can be updated again if the vehicle load state equals the lightly loaded state and the forbidden condition is cleared.

<Effects>

As described above, the gateway ECU 30 according to the embodiment includes the update condition table 30*a* individually indicating the vehicle load states capable of updating the ECU programs correspondingly to each of the ECUs 31 through 44 included in the in-vehicle network system 2.

The gateway ECU 30 wirelessly communicates with the center apparatus 10 to receive an update file from the center apparatus 10. In this case, the gateway ECU 30 uses the update condition table 30*a* to determine whether the current vehicle load state equals the lightly loaded state to enable the target program to be updated or equals the heavily loaded state to disable the target program from being updated.

If the current vehicle load state is determined to equal the lightly loaded state, the gateway ECU 30 uses the update file received from the center apparatus 10 to update the ECU program corresponding to the update file. If the current vehicle load state is determined to equal the heavily loaded state, the gateway ECU 30 performs the environment improvement control based on the update condition table 30*a* to change the current vehicle load state to the lightly loaded state.

The above-mentioned configuration settles the update condition to update an ECU program for the ECU corresponding to the program to be updated and therefore needs not always stop the vehicle 20. Some ECUs can update programs if the update condition is satisfied even when a user is onboard while the vehicle 20 is traveling. This enables to increase chances to update the programs.

The update condition is not satisfied if the vehicle load state equals the heavily loaded state. No ECU program is updated when the vehicle travel is affected, for example. This enables to ensure user's safety.

If no update condition is satisfied, the environment is controlled so that the vehicle load state equals the lightly loaded state. This enables to further increase chances to update the ECU programs. Moreover, the vehicle 20 determines, based on the vehicle load state, whether or not an ECU program can be updated. The vehicle 20 then performs the environment improvement control as needed. The vehicle 20 need not transmit information indicating the vehicle load state to the center apparatus 10. This enables to reduce unnecessary communication costs.

The gateway ECU 30 can safely and more efficiently update the programs at low cost.

The update condition table 30*a* indicates the vehicle load states corresponding to the types of ECU programs. This enables to update even ECU programs installed on the same ECU if an update condition subdivided into program parts or data parts is satisfied. This enables to further increase chances to update the ECU programs.

For example, a user manipulation may be needed to stop the vehicle 20. In such case, the gateway ECU 30 performs the control (user notification control) to notify the user of such situation. The gateway ECU 30 also performs the bus load reduction control to reduce a load on the communication bus 5 to achieve a vehicle load state that requires no user manipulation.

The load on the communication bus 5 is reduced; then, the communication bus 5 is used to transmit an update file. This enables to appropriately update ECU programs while the vehicle 20 is traveling, for example, without affecting the operation of the in-vehicle network system 2 (consequently, without affecting the travel of the vehicle 20).

The non-travel-related ECUs 37 through 44 use one transmission interval to periodically transmit shared data to the other ECUs via the communication bus 5. The travel-related ECUs 31 through 36 use another transmission interval to periodically transmit shared data to the non-travel-related ECUs 37 through 44 via the communication bus 5. The bus load reduction control extends at least one of the transmission intervals within a predetermined allowable range.

The travel-related ECUs 31 through 36 control vehicle components such as an engine and a brake. It is unnecessary to change transmission intervals for information periodically transmitted from the travel-related ECUs 31 through 36 to the other travel-related ECUs 31 through 36. A transmission interval for the other information is extended without directly affecting the travel control on the vehicle 20. This enables to appropriately reduce a bus load.

The bus load reduction control inhibits some of the non-travel-related ECUs 37 through 44 from transmitting information to the other ECUs 30 through 44 via the communication bus 5. This signifies that the information controlling vehicle components such as an engine and a brake is still transmitted from the travel-related ECUs 31 through 36, whereas some of the non-travel-related ECUs 37 through 44 are forced into the bus sleep state without directly affecting the travel control on the vehicle 20. This enables to appropriately reduce a bus load.

In the embodiment, the gateway ECU 30 may exemplify an in-vehicle program update apparatus. The flash memory 26 of the gateway ECU 30 may exemplify a storage portion or means. The communication terminal 3 may exemplify an update file reception portion or means. The MCU 25 of the gateway ECU 30 to perform the process at S150 and S170 may exemplify an update determination section or means. The MCU 25 of the gateway ECU 30 to perform the process at S180 may exemplify a program update section or means. The MCU 25 of the gateway ECU 30 to perform the process at S180 may exemplify an environment improvement section or means. Each of the travel-related ECUs 31 through 36 may exemplify a travel-related electronic control unit. Each of the non-travel-related ECUs 37 through 44 may exemplify a non-travel-related electronic control unit. Throughout this application, "shudan" in Japanese corresponds to "device" or "means" in English.

<Other Embodiments>

While there has been described the embodiment of the present disclosure, the disclosure is not limited to the above-mentioned embodiment but is applicable to various embodiments within the spirit and scope of the disclosure.

In the program update system 1 according to the embodiment, for example, the center apparatus 10 manages ECU program versions corresponding to the vehicle IDs. The center apparatus 10 transmits an update file, if available, to each vehicle 20 when the update file corresponds to the latest version of the ECU program. However, the disclosure is not limited thereto. The gateway ECU 30 in each vehicle 20 may manage ECU program versions for the ECUs 31 through 44. The gateway ECU 30 may inquire the center apparatus 10 about the presence or absence of an update file based on information about the managed ECU program versions.

The in-vehicle program update process according to the embodiment allows the ECUs except the target ECU to transition to the bus sleep state as needed and thereby decreases the usage rate of the communication bus 5. However, the disclosure is not limited thereto. For example, it may be favorable to stop supplying the power to ECUs that exclude the target ECU and do not affect the travel of the vehicle 20. This enables to decrease the usage rate of the communication bus 5 and save the battery 6.

Further, various update conditions specified in the update condition table 30*a* according to the above-mentioned embodiment are merely examples. However, the disclosure is not limited thereto. For example, it may be favorable to prevent the forbidden conditions from being cleared when a target ECU detects a defect using a known self-diagnosis function or when an occupant is detected in the vehicle 20. Some ECUs may inhibit the ECU programs from being updated using tools except a special tool dedicated to a facility.

The in-vehicle LAN 7 according to the above-mentioned embodiment includes the travel-related network 7*a*, the body-related network 7*b*, and the information-related network 7*c*. The related ECUs are correspondingly connected to the common communication buses 5*a*, 5*b*, and 5*c*. However, the disclosure is not limited to this configuration. For example, all the ECUs 30 through 44 may be connected to a single communication bus. The ECUs 37 through 44 in the body-related network 7*b* and the information-related network 7*c* may be connected to a single communication bus.

In the in-vehicle LAN 7 according to the above-mentioned embodiment, the ECUs 31 through 44 are classified into the travel-related ECUs 31 through 36, the body-related ECUs 37 through 42, and the information-related ECUs 43 and 44. However, the disclosure is not limited to this classification. Various classifications may be specified such as classifying the navigation ECU 43 or the meter ECU 37 into the travel-related ECU, for example.

The program update system 1 according to the above-mentioned embodiment uses the gateway ECU 30 as an example of the in-vehicle program update apparatus. However, the disclosure is not limited thereto. At least one of the other ECUs 31 through 44 and the communication terminal 3 may function as the in-vehicle program update apparatus.

Similarly, the gateway ECU 30 includes the update condition table 30*a* in the program update system 1 according to the above-mentioned embodiment. However, the disclosure is not limited thereto. At least one of the other ECUs 31 through 44 and the communication terminal 3 may include the update condition table 30*a* to monitor shared data (vehicle data) in the in-vehicle network system 2.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An in-vehicle program update apparatus in an in-vehicle network system mounted to a vehicle, the in-vehicle program update apparatus being connected to a plurality of electronic control units in the in-vehicle network system via a communication bus, the in-vehicle program update apparatus comprising:
a storage portion having a memory to store an update condition table that indicates a vehicle load state capable of updating a program installed in each of the plurality of electronic control units included in the in-vehicle network system;
the vehicle load state indicated by the storage portion including (i) the vehicle load state during traveling of the vehicle and (ii) the vehicle load state during stopping of the vehicle;
an update file reception portion that wirelessly communicates with an external center apparatus separate from the vehicle and receives from the center apparatus an update file to update the program;
an update determination section to determine, based on the update condition table stored in the storage portion, whether a current vehicle load state equals a lightly loaded state capable of updating a program corresponding to the update file or a heavily loaded state incapable of updating the program when the update file reception portion receives the update file,
the lightly loaded state including (i) a first lightly loaded state during traveling of the vehicle and (ii) a second lightly loaded state during stopping of the vehicle;
a program update section that uses the update file received by the update file reception portion to update, via the communication bus, the program corresponding to the update file when the update determination section determines the lightly loaded state regardless of whether the lightly loaded state is the first lightly loaded state or the second lightly loaded state; and
an environment improvement section that performs an environment improvement control to change the current vehicle load state to the lightly loaded state based on the update condition table stored in the storage portion when the update determination section determines that the current vehicle load state equals the heavily loaded state.

2. The in-vehicle program update apparatus according to claim 1,
wherein the update condition table indicates a vehicle load state corresponding to each type of the program.

3. The in-vehicle program update apparatus according to claim 1,
wherein the program update section transmits the update file to a corresponding electronic control unit via the communication bus connecting with the plurality of electronic control units; and
wherein the environment improvement control is provided as a bus load reduction control that reduces a load on the communication bus as the vehicle load state.

4. The in-vehicle program update apparatus according to claim 3,
wherein the plurality of electronic control units in the in-vehicle network system are classified into travel-related electronic control units to control travel of the vehicle and other non-travel-related electronic control units;
wherein the non-travel-related electronic control unit uses a first transmission interval to periodically transmit information to the other electronic control units via the communication bus;
wherein the travel-related electronic control unit uses a second transmission interval to periodically transmit information to the non-travel-related electronic control unit via the communication bus; and
wherein the bus load reduction control extends at least one of the first transmission interval and the second transmission interval within a predetermined allowable range.

5. The in-vehicle program update apparatus according to claim 3,
wherein the plurality of electronic control units in the in-vehicle network system are classified into travel-related electronic control units to control travel of the vehicle and other non-travel-related electronic control units; and
wherein the bus load reduction control inhibits a part of the non-travel-related electronic control units from transmitting information to the other electronic control units via the communication bus.

6. The in-vehicle program update apparatus according to claim 1,
wherein the plurality of electronic control units in the in-vehicle network system are classified into travel-related electronic control units to control travel of the vehicle and other non-travel-related electronic control units;
wherein the non-travel-related electronic control unit uses a first transmission interval to periodically transmit information to the other electronic control units via the communication bus;
wherein the travel-related electronic control unit uses a second transmission interval to periodically transmit information to the non-travel-related electronic control unit via the communication bus; and
wherein the environment improvement control is provided as a bus load reduction control that reduces a load on the communication bus as the vehicle load state by extending at least one of the first transmission interval and the second transmission interval within a predetermined allowable range.

7. The in-vehicle program update apparatus according to claim 6,
wherein the electronic control units are classified into travel-related electronic control units to control travel of the vehicle and other non-travel-related electronic control units; and
wherein the environment improvement control is provided as a bus load reduction control that reduces a load on the communication bus as the vehicle load state by inhibiting a part of the non-travel-related electronic control units from transmitting information to the other electronic control units via the communication bus.

8. The in-vehicle program update apparatus according to claim 1,
wherein the plurality of electronic control units in the in-vehicle network system are classified into travel-related electronic control units to control travel of the vehicle and other non-travel-related electronic control units; and
wherein the environment improvement control is provided as a bus load reduction control that reduces a load on the communication bus as the vehicle load state by inhibiting a part of the non-travel-related electronic control units from transmitting information to the other electronic control units via the communication bus.

9. The in-vehicle program update apparatus according to claim 1, wherein:
the communication bus via which the electronic control units are connected uses at least two mutually different communication protocols.

10. An in-vehicle program update system in a vehicle, cooperating with an external center apparatus that transmits an update file to update programs installed in multiple electronic control units in an in-vehicle network in the vehicle, the in-vehicle program update system including:
a communication terminal that wirelessly communicates with the external center apparatus separate from the vehicle; and
a gateway apparatus that is connected with the communication terminal to communicate with the external center apparatus via the communication terminal, the gateway apparatus being connected with the electronic control units in the in-vehicle network via a communication bus,
the gateway apparatus comprising:
a storage portion having a memory that stores an update condition table that indicates a vehicle load state capable of updating a program installed in each of the electronic control units;
an update file reception section that receives an update file to update the program from the external center apparatus via the communication terminal;
an update determination section that determines, based on the update condition table stored in the storage portion, whether a current vehicle load state equals a lightly loaded state capable of updating a program corresponding to the update file or a heavily loaded state incapable of updating the program when the update file reception section receives the update file;
a program update section that uses the update file received by the update file reception section to update, via the communication bus, the program corresponding to the update file when the update determination section determines the lightly loaded state; and
an environment improvement section that performs an environment improvement control to change the current vehicle load state to the lightly loaded state based on the update condition table stored in the storage portion when the update determination section determines that the current vehicle load state equals the heavily loaded state.

11. The in-vehicle program update system according to claim 10, wherein:
the communication bus via which the gateway apparatus is connected with the electronic control units uses at least two mutually different communication protocols.

12. The in-vehicle program update system according to claim 10, wherein:
the vehicle load state indicated by the storage portion includes (i) the vehicle load state during traveling of the vehicle and (ii) the vehicle load state during stopping of the vehicle; and
the lightly loaded state determined by the update determination section includes (i) a first lightly loaded state during traveling of the vehicle and (ii) a second lightly loaded state during stopping of the vehicle.

13. The in-vehicle program update system according to claim 10,
wherein the update condition table indicates a vehicle load state corresponding to each type of the program.

14. The in-vehicle program update system according to claim 10,
wherein the program update section transmits the update file to a corresponding electronic control unit via the communication bus; and
wherein the environment improvement control is provided as a bus load reduction control that reduces a load on the communication bus as the vehicle load state.

15. The in-vehicle program update system according to claim 10,
wherein the electronic control units are classified into travel-related electronic control units to control travel of the vehicle and other non-travel-related electronic control units;
wherein the non-travel-related electronic control unit uses a first transmission interval to periodically transmit information to the other electronic control units via the communication bus;
wherein the travel-related electronic control unit uses a second transmission interval to periodically transmit information to the non-travel-related electronic control unit via the communication bus; and
wherein the environment improvement control is provided as a bus load reduction control that reduces a load on the communication bus as the vehicle load state by extending at least one of the first transmission interval and the second transmission interval within a predetermined allowable range.

* * * * *